United States Patent [19]

Snow

[11] Patent Number: 5,480,004
[45] Date of Patent: Jan. 2, 1996

[54] CROSSPORT AND SINGLING MANIFOLD FOR A SERIES PROGRESSIVE DIVIDER VALVE

[75] Inventor: John P. Snow, Sagamore Hills, Ohio

[73] Assignee: Lubriquip, Inc., Cleveland, Ohio

[21] Appl. No.: 337,539

[22] Filed: Nov. 9, 1994

[51] Int. Cl.⁶ .................................................... F16N 27/00
[52] U.S. Cl. ................................................ 184/7.4; 184/8
[58] Field of Search .................................. 184/7.4, 8, 29

[56] References Cited

U.S. PATENT DOCUMENTS

| 4,105,094 | 8/1978 | Callahan. | |
|---|---|---|---|
| 4,186,821 | 2/1980 | Wegmann | 184/7.4 |
| 4,312,425 | 1/1982 | Snow et al.. | |
| 4,520,902 | 6/1985 | Snow. | |
| 5,197,568 | 3/1993 | Horttonen | 184/7.4 |
| 5,311,968 | 5/1994 | Pingel | 184/29 |

FOREIGN PATENT DOCUMENTS 0534163  3/1993  European Pat. Off. ................ 184/7.4

*Primary Examiner*—Thomas E. Denion
*Attorney, Agent, or Firm*—Hill, Steadman & Simpson

[57] ABSTRACT

In a series progressive divider valve having a number of identical valve units disposed adjacent to each other, each formed by a base member and a spool member having a movable spool therein, a manifold in the form of a plate which can be inserted between the base member and the spool member of a valve unit selectively permits the porting between that valve unit and an adjacent valve unit to be modified so as to direct the output of lubricant to a different location from the output location which would occur in the absence of the manifold. The output can be directed to an output port of the valve unit in which the manifold is inserted (singling) or can be directed to an adjacent valve unit (crossporting). A number of such plates can be stacked to provide further selectivity in directing the lubricant output. The manifold permits the overall output/lubricant delivery configuration of the divider valve to be customized while still permitting each individual valve unit to retain its identical structure, thereby preserving the manufacturing and assembly advantages associated with the use of identical valve units.

23 Claims, 4 Drawing Sheets

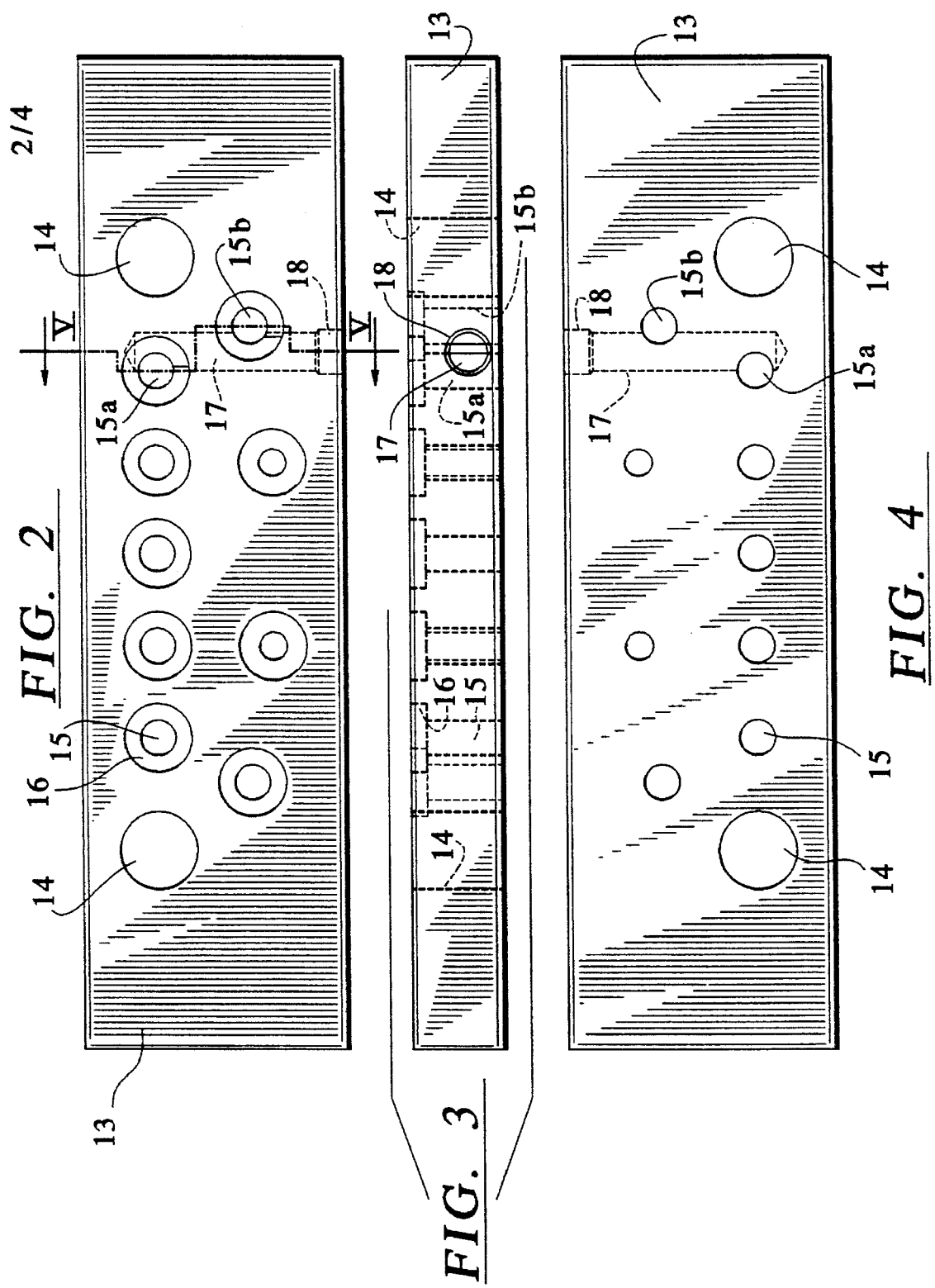

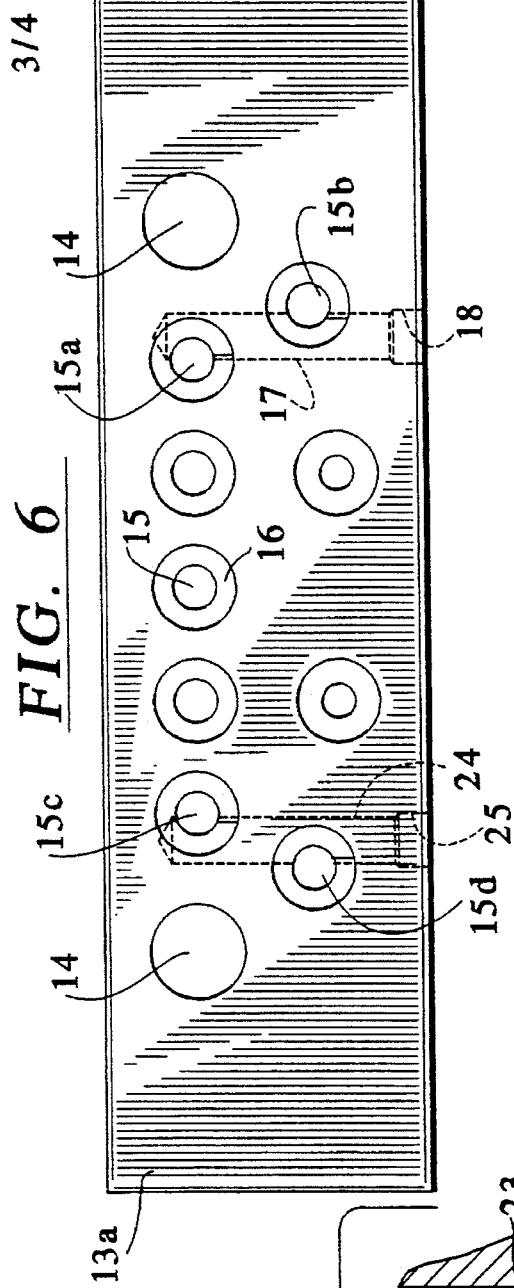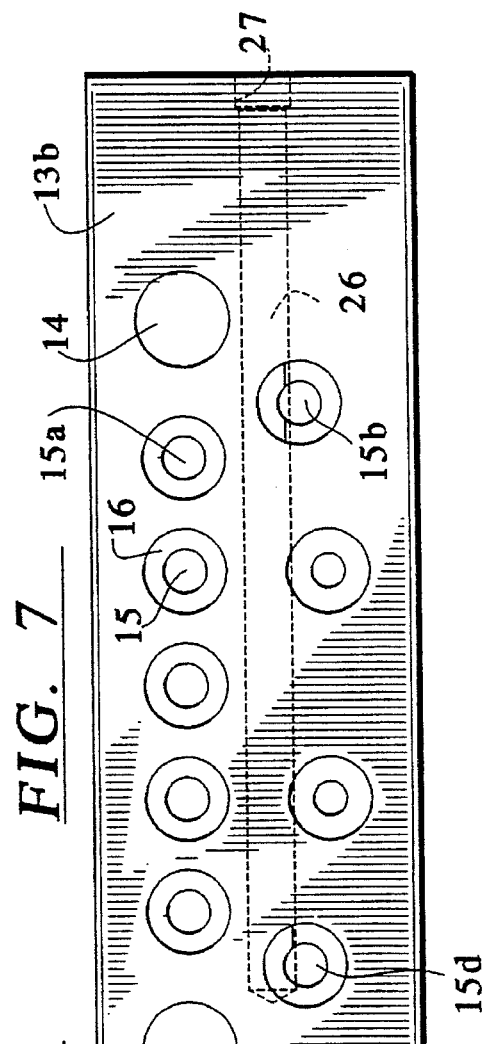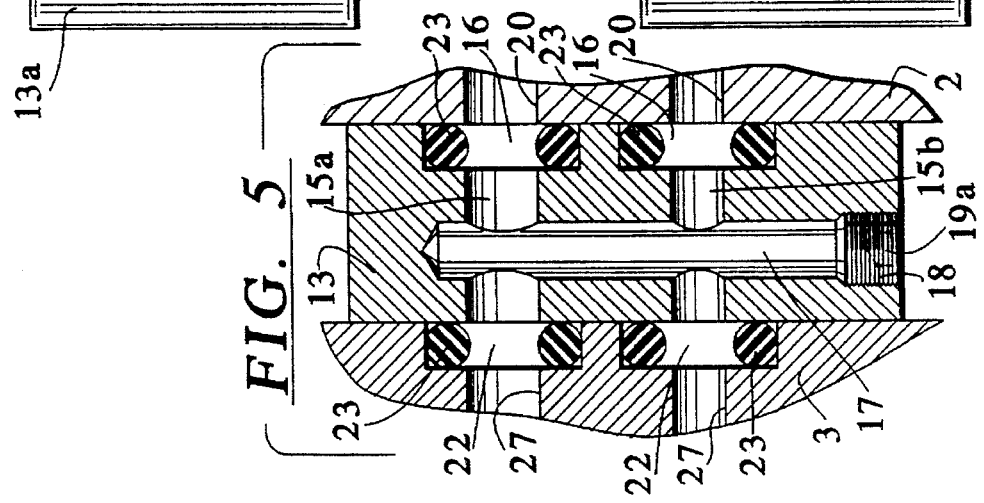

CROSSPORT AND SINGLING MANIFOLD FOR A SERIES PROGRESSIVE DIVIDER VALVE

BACKGROUND OF THE INVENTION

1. Field of the Invention

The present invention relates generally to the field of lubricant distributor valves, and more particularly to lubricant distributor valves which are constructed, adapted and arranged to operate cyclically, that is, to meter and discharge a predetermined quantity of lubricant to each of a number of points of use, such as bearings, in a sequence.

2. Description of the Prior Art

Lubricant distributor valves of the type generally described above are known in the art and are commonly referred to as series progressive divider valves. Most often, such valves are constructed of a number of separate valve blocks which are sandwiched together between an inlet block unit and an end block unit, with all of the units being held together by bolts. This type of construction enables the various units to be separated and removed from each other for cleaning, repair and, if necessary, replacement of one or more units.

Such a progressive series divider valve is described, for example, in U.S. Pat. No. 4,312,425, wherein each of the valve blocks has an identical structure, and wherein each valve block is formed by two parts, namely a base part and a feeder part in the form of a spool member, the spool member having a bore within which a movable spool is disposed. By means of suitable hydraulic circuitry, the respective spools in the series of valve units are progressively operated so as to cause lubricant to be cyclically distributed from an output port in each valve unit. The number of valve units which are employed for a given purpose is dependent on the number of locations requiring lubrication, with more identical valve units simply being added on as needed.

The base member and the spool member in each valve unit are held together by bolts extending through both parts, so that the parts can be separated for the aforementioned purposes of cleaning, repair or replacement.

An advantage of this type of structure for a series progressive divider valve is that, because of the identical structure of each valve unit, manufacture and assembly are greatly simplified. Because of the identical structure of each valve unit, however, the location and interconnection of each of the lubricant output ports of the overall assembly cannot be varied within the divider valve itself, and if such variation is desired for a particular application, additional valving and/or lubrication delivery lines must be employed in combination with the valve assembly.

SUMMARY OF THE INVENTION

It is an object of the present invention to provide a series progressive valve assembly of the type formed by a plurality of identical valve units disposed between an end block unit and an inlet block unit, wherein the interconnection of lubricant outlet ports within the valve unit can be selectively varied, while preserving the identical structure of each valve unit.

It is a further object of the present invention to provide a series progressive divider valve constructed from a series of identical modules, wherein one or more modules can be selectively varied so as to divert the delivery of lubricant to a different output port in one modular valve unit (singling), or to interconnect adjacent valve units so as to divert the delivery of lubricant from one valve unit to an output port in an adjacent valve unit (crossporting).

The above and other objects are achieved in accordance with the principles of the present invention in a manifold for a series progressive divider valve, the divider valve formed of a plurality of identical, adjacent valve units each having a base part and a feeder part, with the manifold being insertable between the base part and the feeder part of one or more valve units to achieve the desired porting. The manifold is in the form of at least one plate, having a plurality of bores therein in registry with the passages communicating between a base part and a feeder part of a valve unit, so that the manifold can be inserted between the base part and the feeder part to preserve the normal passage of fluid such as lubricant between the base part and the feeder part. These bores proceed vertically through the plate forming the manifold. The plate also has at least one additional bore therein, drilled through a side of the plate so as to proceed in a plane which extends through the vertically-proceeding bores. The additional bore is disposed in the plate so as to provide a fluid communication path between at least two of the vertically proceeding bores, thereby providing a new and different fluid flow path between the base part and the feeder part. Dependent on the vertical bores which are interconnected in this manner in the manifold plate, the delivery of fluid (lubricant) can be diverted or augmented from its "normal" path (the "normal" path being the flow path which would exist in the absence of the manifold plate).

The manifold can be formed by multiple plates of this type, each plate having a different interconnection path therein by virtue of a differently oriented additional bore or bores, so that a high degree of selectivity is achieved in varying the porting for the divider valve. This selectivity capability provides a number of significant advantages, some of which are as follows. It is frequently necessary to relegate one outlet port for connection to a performance indicator, such as some type of sensor and/or display, and the above-described selectivity permits the location of this indicator port to be selected as needed for a given application. The selectivity also permits this indicator port to be used as an alternate port for the delivery of lubrication to a lubrication site, if desired.

Since it is not necessary to add external fluid lines and valves to the divider valve assembly in order to customize the assembly, the possibility of leakage from an external port is eliminated. By eliminating the possibility of leakage, higher hydraulic pressures are attainable. Heretofore, pressure capability was a limiting factor in the singling and crossporting of divider valve sections.

The manifold permits singling and crossporting in the same valve section to be achieved.

When crossporting from one valve unit to an adjacent valve unit, leakage is eliminated because the tolerance build-up of individual components no longer needs to be considered.

The overall assembly and installation of a divider valve with selected singling or crossporting is considerably less complicated, and the overall assembly has a lower profile than was heretofore achievable.

The need for additional porting bars, caused by a demand for different outlet port sizes, is eliminated. In addition to the increased pressure capability which is achieved by avoiding locations at which leaks may occur, pressure capability is also enhanced by virtue of maintaining shorter flow paths, because the shorter the flow path, the lower the pressure drop associated therewith.

Because of the flexibility of using a port which would be normally relegated as an indicator port for other purposes, the indicator port can now be used for bleeding air out of the system, if necessary.

Since each valve unit can be provided with its own manifold, the possibility of an incorrect installation is minimized. Only the valve section which is modified by the insertion of the manifold is altered, with all of the other valve sections remaining identical.

DESCRIPTION OF THE DRAWINGS

FIG. 2 is a bottom view of a first embodiment of a plate forming a manifold constructed in accordance with the principles of the present invention, for use in the assembly of FIG. 1.

FIG. 3 is a side view of the plate shown in FIG. 2.

FIG. 4 is a top view of the plate shown in FIG. 2.

FIG. 5 is a sectional view of the plate shown in FIG. 2, together with surrounding portions of the divider valve assembly, taken along line V—V of FIG. 2.

FIG. 6 is a bottom view of a further embodiment of a plate forming a manifold for use in the divider valve assembly shown in FIG. 1.

FIG. 7 is a bottom view of a further embodiment of a plate forming a manifold for use in the valve assembly of FIG. 1.

DESCRIPTION OF THE PREFERRED EMBODIMENTS

Figure 1:
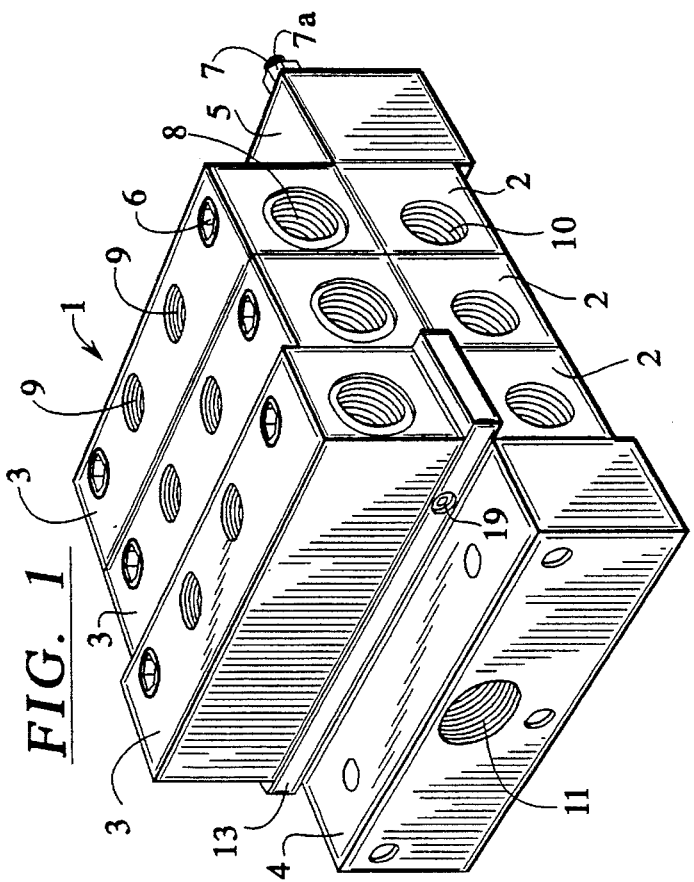
FIG. 1 is a perspective view of a series progressive divider valve assembly incorporating a manifold constructed in accordance with the principles of the present invention.

A series progressive divider valve 1 is shown in FIG. 1, formed by a number of identical valve units, each valve unit being formed by a base part 2 and a feeder part 3, disposed between an inlet block 4 and an end block 5. The divider valve assembly, except for the manifold described below, has the structure, and operates, as disclosed in U.S. Pat. No. 4,312,425 (Cyclic Lubricant Distributor Valve, Snow et al.), the teachings of which are incorporated herein by reference. Accordingly, only the details of the assembly 1 which are necessary to explain the structure and operation of the manifold will be specifically discussed below.

The base part 2 and the feeder part 3 of each valve unit are held together by bolts 6. The inlet block 4 and the end block 5, with the valve units therebetween, are held together by bolts 7, one of which is visible in FIG. 1. Each bolt 7 extends through each of the end block 5, the valve units, and into the inlet block 4. An end of the bolt 7 which is disposed in the inlet block 4 is threaded, or otherwise secured inside the inlet block 4, however, all of the valve units, as well as the end block 5, have respective bores therein which are in registry and which receive each bolt 7 without restraint. The inlet block 4, the valve units and the end block 5 are held tightly together by nuts 7a, which are respectively threaded onto the bolts 7.

The divider valve assembly shown in FIG. 1, therefore, is a completely modular assembly, with each of the valve units as well as the end block 5 being separable from each other and from the inlet block 4 and each feeder part 3 is separable from its associated base part 2. Although the manifold disclosed below will be described in the context of such a completely modular assembly, it will be apparent that the manifold could be employed in a non-modular valve assembly as well.

Each spool unit 3 has a bore 8 extending the entire width thereof, in which a valve spool (not shown) is disposed and is movable by hydraulic actuation to selectively distribute lubricant in a sequence via an output port 10 in each of the base parts 2. After the spool has been placed in the bore 8, each end of the bore 8 is plugged by a threaded plug (not shown) to create a closed chamber in which the spool slides laterally.

Each of the valve units formed by a base part 2 and a feeder part 3 is of identical structure. Each base part 2 and feeder part 3 has a plurality of vertical noncommunicating passages therein, which are in registry when the feeder part 3 is in place on its associated base part 2. Dependent on the position of the spool valve within the bore 8 as a result of hydraulic actuation, one or more of these passages is placed in fluid communication with a passage extending the length of the valve assembly which is, in turn, in fluid communication with an inlet port 11. Lubricant entering the valve assembly via the input port 11 is thereby directed in a sequence out of each output port 10, dependent on the respective positions of the spools in the bores 8 of each feeder part 3.

Figure 8:
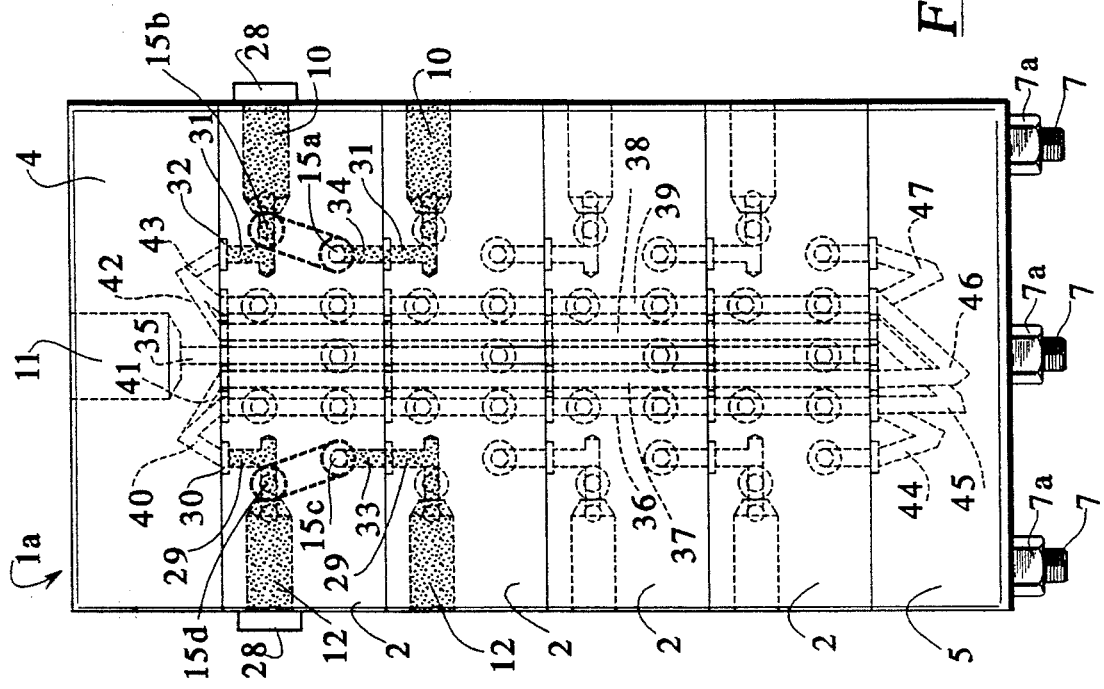
FIG. 8 is a bottom view of a divider valve assembly incorporating a manifold plate in the embodiment of FIG. 6, showing the resulting crossporting.
Figure 10:
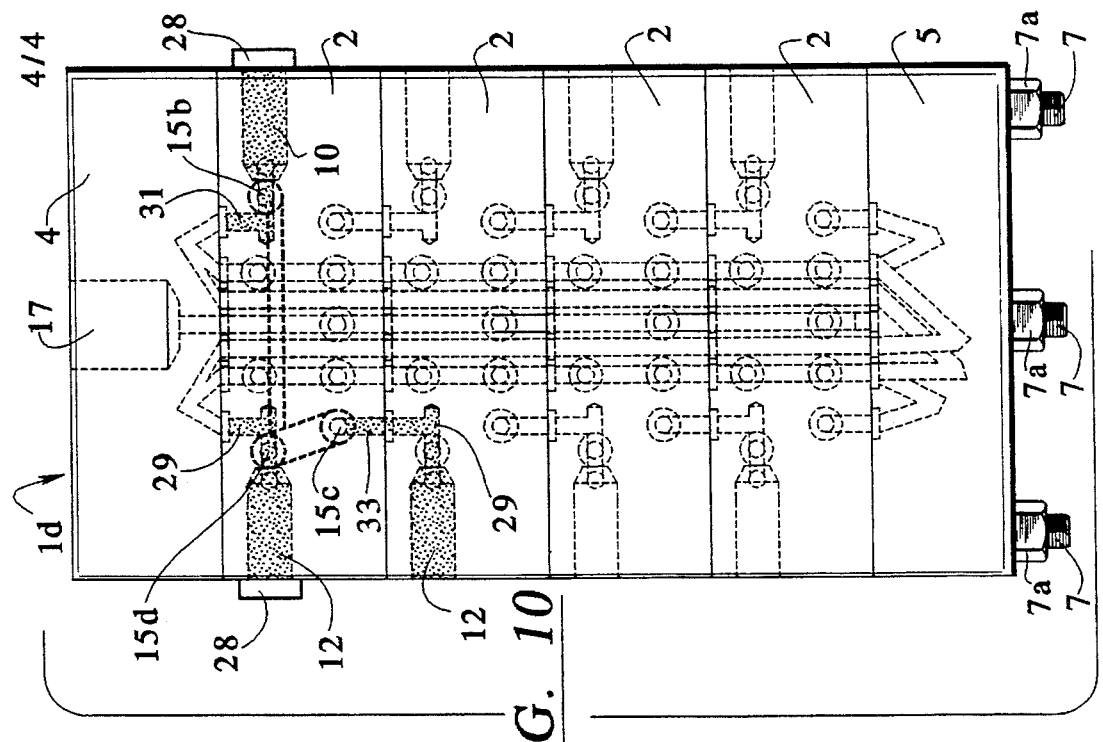
FIG. 10 is a bottom view of a divider valve assembly incorporating a manifold formed by plate of the type employed in the assembly of FIG. 9, and a plate as shown in the embodiment of FIG. 7.
Figure 9:
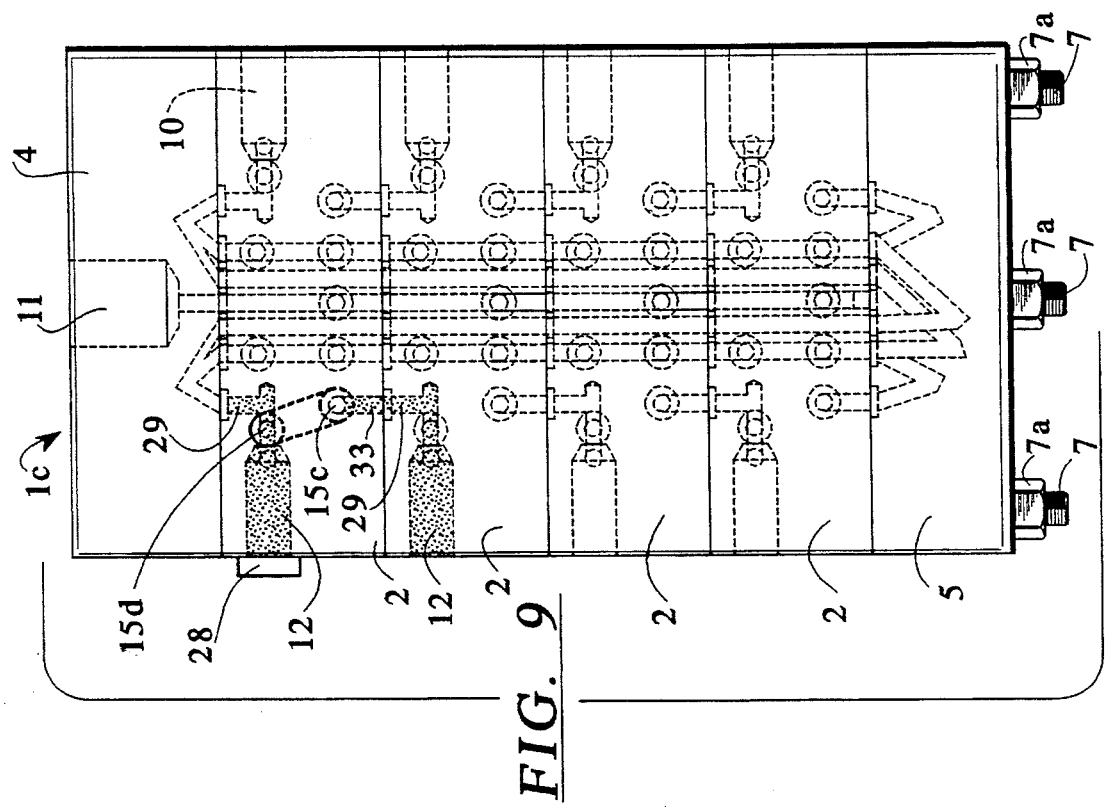
FIG. 9 is a bottom view of a divider valve assembly incorporating a manifold plate which is a mirror-symmetric version of the embodiment shown in FIGS. 2, 3 and 4.

The vertically proceeding passages in each base part 2 and feeder part 3 are not shown in detail, however, their respective positions can be seen in the bottom views of the assemblies shown in FIGS. 8, 9 and 10. At the faying surfaces at the top of the base part 2 and the bottom of the feeder part 3 at which the respective passages in those parts communicate, a grommet (not shown) is provided in an annular recess surrounding one of those passages, preferably in the feeder part 3.

In the divider valve assembly 1 shown in FIG. 1, a manifold formed by a plate 13 is shown inserted between the base part 2 and the feeder part 3 of one of the valve units. Further details of this plate 13 are shown in FIGS. 2, 3 and 4. As can be seen in FIGS. 2, 3 and 4, the plate 13 contains two bores 14 for respectively receiving the bolts 6 which hold the feeder part 3 and the base part 2 together, with the plate 13 sandwiched therebetween. The plate 13 has a plurality of further vertically proceeding bores 15 therein, which are respectively in registry with the vertically proceeding passages in the feeder part 3 and in the base part 2. Each bore 15, preferably at the faying surface at a bottom of the plate 13, is provided with an annular recess or rim 16, which receives a resilient grommet 23, which serves as a seal. The plate 13 has a further bore 17 drilled through a side of the plate 13, and extending in a plane proceeding substantially perpendicularly to the vertical bores 15. The further bore 17 is disposed so as to extend through at least a portion of two of the vertically proceeding bores 15, these two bores being designated 15a and 15b. The further bore 17 thereby places the bores 15a and 15b in fluid communication. The further bore 17 has an enlarged region 18 near the exterior of the plate 13, which is closed by a plug 19 (see FIG. 1). The further bore 17 thereby forms a closed chamber permitting fluid flow between the bores 15a and 15b.

The arrangement of the plate 13 between the base part 2 and the feeder part 3 of a valve unit is shown in the sectional view of FIG. 5, wherein the grommets 23 can also be seen in section. Each of the bores 15a and 15b is in registry with a respective passage 20 in the base part 2 and a respective passage 21 in the feeder part 3. The bore 17 thus places both passages 20 in the base part 2 in fluid communication with both passages 21 in the feeder part 3, whereas normally (i.e., without the plate 13 in place) each passage 20 would only be in fluid communication with the passage 21 in registry therewith.

As can also be seen in the sectional view of FIG. 5, the enlarged portion 18 of the bore 17 may be threaded, so as to receive a threaded plug having a receptacle 19a therein to receive the tip of a tool for inserting the plug.

A further embodiment of a manifold plate 13a is shown in FIG. 6, which can be placed in the assembly 1 shown in FIG. 1 in the same manner as the plate 13. In the embodiment of the manifold plate 13a shown in FIG. 6, another bore 24 is provided, in addition to the bore 17, proceeding in the plane perpendicularly to the vertically proceeding passages 15. The bore 24 has an enlarged region 25, which will be plugged, and places vertically proceeding passages 15c and 15d in fluid communication.

Another embodiment of a manifold plate 13b is shown in FIG. 7. In this embodiment, the further bore is drilled from an end of the plate 13b, resulting in a bore 26 extending laterally through the plate 13b, and thereby placing vertically proceeding bores 15b and 15d in fluid communication. The bore 26 has an enlarged region 27, which will be plugged.

A divider valve assembly 1a is shown in FIG. 8, in which a manifold plate corresponding to the manifold plate 13a shown in FIG. 6 is incorporated. The valve assembly 1a shown in FIG. 8 is illustrated as having four valve units, as opposed to the three valve units shown in the valve assembly 1 of FIG. 1, to indicate the expandability of the assembly. The fluid connections produced by the respective bores 17 and 24 are illustrated by dashed lines in FIG. 8, showing that the vertical bores 15a and 15b are connected in fluid communication with each other, and the vertical bores 15c and 15d are connected in fluid communication with each other. The interconnection of the bore 15c with the bore 15d causes a passage 29 in the base part 2 below the plate 13a to be in fluid communication with a passage 33, which in turn is in registry with a passage 29 in the adjacent base part 2. The outlet port 12 of the base part 2 which is beneath the plate 13a is closed by a threaded plug 28. Normally, i.e., without the manifold plate 13a being present, lubricant flowing through the passage 29 in the base part 2 adjacent to the inlet block 4 would flow directly out of that base part 2 through its outlet port 12. By virtue of the interconnection produced by the manifold plate 13a, however, and the plugging of the outlet port 12 by the plug 28, lubricant instead flows through the manifold plate 13a into the identical passage 29 in the adjacent base part 2, and thus flows out of the outlet port 12 in that base part 2.

A similar flow path is produced at the other side of the assembly 1a by virtue of the flow path produced by the interconnection of the bores 15a and 15b. At this side, lubricant would normally flow from the passage 31 in the base part 2 adjacent the inlet block 4, and out through output port 10. Outlet port 10 is, however, plugged by a threaded plug 28, thereby instead causing the lubricant to flow through the manifold plate 13a and through a passage 34 in the base part 2 beneath the plate 13a. The lubricant is thus caused to enter into an identical passage 31 in the adjacent base part 2, and thus flows out of the outlet port 10 in that base part 2.

At each location wherein passages communicate between adjacent valve units or blocks, the passage is provided with a recess which receives a resilient grommet identical to the grommets 23 shown in FIG. 5. Two such recesses 30 and 32 are provided with reference numerals in FIG. 8, for the respective passages 29 and 31.

As also shown in FIG. 8, for illustrative purposes only, the assembly 1a has a number of internal passages extending the length thereof, formed by respective, identical passages in each base part 2. Each base part 2, accordingly, has respective passages 36, 37, 38 and 39 therein. In the inlet block 4, a passage 40 connects the passage 36 to the passage 29. A passage 41 connects the passage 37 to another passage (not shown) at a different level in the base part 2. A passage 42 connects the passage 38 to another passage (not shown) at a different level in the base part 2, and a passage 43 connects the passage 39 to the passage 31 in the base part 2.

Additionally, each base part 2 is provided with a central passage which form, in combination, a passage 35 extending the length of the valve assembly 1a, which is in communication with the inlet port 11, and through which input lubricant is supplied to each valve unit.

In the end block 5, passages 44, 45, 46 and 47 provide further connections between the respective passages.

In the divider valve assembly 1c shown in FIG. 9, a manifold plate which is a mirror-symmetric version of the embodiment shown in FIGS. 2, 3 and 4 is incorporated, so as to produce a connection between the vertical bores 15c and 15d, in the same manner as described with respect to one side of the assembly 1a shown in FIG. 8. Since the output port 12 in the base part 2 adjacent to the inlet block 4 is plugged by the plug 28, lubricant is caused to flow from the passage 29, through the interconnected bores 15d and 15c in the manifold plate, through the identical passage 29 in the adjacent base part 2, and out of the output port 12 of that adjacent base part 2. Since there is no interconnection provided at the other side of the valve assembly 1c, lubricant flows out of the other outlet port 10 in the normal manner.

FIG. 10 shows a valve assembly 1d wherein the manifold has been formed by two plates, namely a plate such as used in the embodiment of FIG. 9, plus the plate 13b shown in FIG. 7. The use of the plate which interconnects the bores 15c and 15d produces the fluid flow path as described in connection with FIG. 9, and the presence of the additional plate 13b produces a further connection between the passage 29 and the passage 31 in the base part 2 which is adjacent to the inlet block 4. Since the outlet port 10 in this base part 2 has also been plugged by a plug 28, lubricant is caused to flow from the passage 31 in that base part 2 through the bores 15b in each of the manifold plates, and over to the bore 15d in the manifold plate 13b. By virtue of the aforementioned interconnection between the bores 15d and 15c, lubricant from the passage 31 is caused to flow out of the output port 12 in the adjacent base part 2.

Diversion of the fluid flow from one base part to an adjacent base part is referred to as "crossporting." If only the manifold plate 13b had been used, by itself, in the assembly of FIG. 10, the two output ports 10 and 12 in the same base part 2 would have been interconnected. This is referred to as "singling." In the case of singling, one of the output ports 10 or 12 can be plugged, if desired, or lubricant can be permitted to flow out of both output ports 10 and 12.

In all of the embodiments of the plate or plates which form the manifold, the bores 15 are arranged in two rows, generally along a respective row axis, the row axis proceeding in a longitudinal direction (i.e., parallel to the longer side) of the plate 13. In the embodiments shown in FIGS. 2–4 and FIG. 6, at least one bore 15 in one of the rows is disposed with respect to one bore 15 in the other row so that the two bores 15 in the different rows can be intersected by a further bore (i.e., the further bore 17), which is a straight bore. This imposes the requirement that the two bores which are desired to be placed in communication in the two different rows cannot be offset from each other, along their respective row axis, by an amount greater than the diameter of the further bore 17, if the further bore 17 is intended to be drilled perpendicularly to the longer side of the plate 13. The bores to be interconnected can be offset by a greater amount if slant drilling is acceptable.

Similarly, in the embodiment of FIG. 7, if the two bores which are to be interconnected are not adjacent, they must be disposed slightly offset to one side of the row axis, while any intervening bores must be slightly offset to the other side of the row axis, so that again a straight bore can be employed as the further bore 26, so as to simultaneously intercept the bores such as the bores 15b and 15d, without intersecting the intervening bores.

Although modifications and changes may be suggested by those skilled in the art, it is the intention of the inventor to embody within the patent warranted hereon all changes and modifications as reasonably and properly come within the scope of his contribution to the art.

I claim as my invention:

1. In a series progressive divider valve assembly having a fluid input, a plurality of fluid outputs, and a plurality of adjacent valve units, each valve unit having a plurality of non-communicating passages therein extending between a lower region of the valve unit and an upper region of the valve unit, at least some of said passages establishing a first complete fluid flow path between said fluid input and a fluid output, the improvement comprising:

a manifold disposed between said lower region and said upper region of at least one valve unit, said manifold having a plurality of bores therein respectively disposed in registry with said passages in said at least one valve unit, and having at least one further bore therein extending between at least two of said bores and placing said at least two bores and the passages respectively in registry therewith in fluid communication and establishing a second complete flow path between said fluid input and a different fluid output.

2. The improvement of claim 1 wherein said lower region and said upper region of each valve unit are separable, and wherein said manifold comprises at least one plate insertable between the lower region and the upper region of a valve unit.

3. The improvement of claim 1 wherein said bores in registry with said passages are disposed in said manifold in a plurality of rows, each row extending along a row axis, and wherein said at least one further bore comprises a straight bore extending perpendicularly to said row direction and having a diameter of a size for intersecting at least a portion of one bore in one of said rows and at least a portion of one bore in at least one other of said rows.

4. The improvement of claim 1 wherein said bores are disposed in said manifold in a row having a row axis, said row having bores disposed on opposite sides of said row axis, and wherein said further bore comprises a straight bore extending parallel to said row axis and having a diameter of a size for intersecting at least two bores on one side of said row axis and no bores on an opposite side of said row axis.

5. The improvement of claim 1 wherein said manifold comprises means for singling said passages in said at least one valve unit.

6. The improvement of claim 1 wherein said manifold comprises means for crossporting passages in said at least one valve unit with passages in an adjacent valve unit.

7. In a series progressive divider valve assembly having a fluid input, a plurality of fluid outputs, and a plurality of adjacent valve units, each valve unit having a plurality of non-communicating passages therein extending between a lower region and an upper region of a valve unit, at least come of said passages establishing a first complete fluid flow path for that valve unit between said fluid input and a fluid output, the improvement comprising:

manifold means disposed between said lower region and said upper region of at least one valve unit for converting said first flow path into a second, different, complete fluid flow path between said fluid input and a different fluid output wherein at least two of said passages are in fluid communication with each other.

8. The improvement of claim 7 wherein said lower region and said upper region of each valve unit are separable, and wherein said manifold means comprises at least one plate insertable between the lower region and the upper region of a valve unit.

9. The improvement of claim 8 wherein said manifold means comprises two plates disposed in registry between said lower region and said upper region of a valve unit, one of said two plates having a first flow pattern therein and the other of said two plates having a second flow pattern therein, different from said first pattern, and said first and second flow patterns in combination with said first flow path forming said second flow path.

10. A series progressive divider valve assembly comprising:

an input block unit having a lubricant input;

an end block unit;

a plurality of valve units disposed between said input block unit and said end block unit;

each of said valve units comprising a base part and an associated feeder part, each base part having a lubricant inlet port in communication with said lubricant input and at least one lubricant outlet port and each feeder part having a hydraulically actuatable element therein for causing lubricant to be delivered to an outlet port of its associated base part, each feeder part and associated base part having respective faying surfaces abutting one another, each of said faying surfaces having a set of openings of non-communicating passages therein, with the openings in said base part and the associated feeder part being in registry, at least some of said passages establishing a first, complete fluid flow path between said lubricant inlet port and a lubricant outlet port;

means, including said passages, forming hydraulic circuitry in said input block unit, said end block unit and said valve units for interconnecting said lubricant input, said hydraulically actuatable elements and said outer ports for cyclic operation of said valve units, said hydraulic circuitry interconnecting each feeder part with its associated base part only through said faying surfaces;

a manifold disposed in at least one of said valve units between the respective faying surfaces of the base part and the feeder part thereof, said manifold having a plurality of bores therein respectively disposed in registry with said openings, and having at least one further bore therein extending between at least two of said bores and placing said at least two bores and the passages respectively in registry therewith in fluid communication and establishing a second, complete fluid flow path between said lubricant inlet port and a different outlet port;

first fastening means for fastening said input block unit, said end block and said base parts in a fixed assembly; and second fastening means for fastening each feeder part in fixed assembly only to its associated base part and, in said at least one valve unit, for fastening said feeder part and its associated base part in fixed assembly with said manifold therebetween.

11. A series progressive divider valve assembly as claimed in claim 10 wherein said manifold comprises a manifold plate having said bores therein extending in a first direction and having said further bore therein extending in a second direction perpendicular to said first direction.

12. A series progressive divider valve as claimed in claim 10 wherein said manifold comprises two plates disposed in registry with each plate respectively having a differently oriented further bore therein.

13. The improvement of claim 10 wherein said bores in registry with said passages are disposed in said manifold in a plurality of rows, each row extending along a row axis, and wherein said at least one further bore comprises a straight bore extending perpendicularly to said row direction and having a diameter of a size for intersecting at least a portion of one bore in one of said rows and at least a portion of one bore in at least one other of said rows.

14. The improvement of claim 10 wherein said bores are disposed in said manifold in a row having a row axis, said row having bores disposed on opposite sides of said row axis, and wherein said further bore comprises a straight bore extending parallel to said row axis and having a diameter of a size for intersecting at least two bores on one side of said row axis and no bores on an opposite side of said row axis.

15. The improvement of claim 10 wherein said manifold comprises means for singling said passages in said at least one valve unit so that the output port connected to said inlet port in said first flow path and the different output port connected to said inlet port in said second flow path are both in said at least one valve unit.

16. The improvement of claim 10 wherein said manifold comprises means for crossporting passages in said at least one valve unit with passages in an adjacent valve unit.

17. A method for producing a selected flow pattern in a series progressive divider valve assembly comprising the steps of:

assembling a plurality of valve units in succession adjacent each other, each valve unit having a fluid inlet port and at least one fluid outlet port and a plurality of non-communicating passages therein extending between a lower region of the valve unit and an upper region of the valve unit establishing a first, complete fluid flow path between said inlet port and an outlet port;

providing a manifold having a plurality of bores therein;

disposing said manifold between said lower region and said upper region of at least one valve unit so that said bores in said manifold are respectively disposed in registry with said passages in said at least one valve unit; and providing at least one further bore in said manifold extending between at least two of said bores in said manifold for placing said at least two bores and the passages in said at least one valve unit respectively in registry therewith in fluid communication and establishing a second complete fluid flow path between said inlet port and a different outlet port.

18. A method as claimed in claim 17 wherein the step of providing a manifold comprises providing a manifold plate having said bores and said further bore therein.

19. A method as claimed in claim 17 wherein the step of providing a manifold comprises providing a plurality of manifold plates each having a plurality of bores therein disposed in registry with each other and with said passages in said at least one valve unit, and wherein the step of providing said further bore in said manifold is further defined by providing a respective further bore in each of said manifold plates, said respective further bores each being differently oriented for placing two different bores in each manifold plate in fluid communication.

20. A method for modifying a fluid flow pattern in a progressive divider valve assembly, comprising the steps of:

arranging a plurality of valve units, each valve unit having an inlet port and at least one outlet port and a plurality of non-communicating passages therein extending between a lower region and an upper region of each valve unit, for establishing a first, complete fluid flow path in at least one of said valve units between said fluid inlet port and a fluid outlet port; and disposing a manifold between the lower region and the upper region of at least one valve unit for converting said first flow path into a second, different complete flow path between said inlet port and a different outlet port wherein at least two of said passages in said at least one valve unit are in fluid communication with each other.

21. A method as claimed in claim 20 comprising the additional step of providing a plate as said manifold and providing a plurality of bores in said plate in registry with said passages in said at least one valve unit and providing a further bore in said plate placing two of said bores in said plate, and the passages in registry therewith, in fluid communication.

22. A method as claimed in claim 20 comprising the additional steps of:

providing a first plate having a plurality of bores with a first flow pattern among said bores;

providing a second plate having a plurality of bores therein in registry with said bores in said first plate and establishing a second flow pattern among said bores in said second plate; and forming said manifold by combining said first and second plates with said bores in registry and disposing said first and second plates between said lower region and said upper region of said at least one valve unit with said first, and second flow patterns in combination with said first flow path forming said second flow path.

23. A method for manufacturing a series progressive divider valve assembly comprising the steps of:

providing an input block unit with a lubricant input;

forming a plurality of valve units by combining a base part and an associated feeder part, each base part having a lubricant inlet port in communication with said lubricant input and at least one lubricant outlet port and each feeder part having a hydraulically actuatable element therein for causing lubricant to be delivered to an outlet port of its associated base part, each feeder part and associated base part having respective faying surfaces with each faying surface having a set of openings of non-communicating passages therein, at least come of said passages establishing a first, complete fluid flow path between said inlet port and an outlet port;

forming each valve unit by abutting the faying surfaces of said base part and an associated feeder part with the openings in said base part and the associated feeder part in registry;

arranging a plurality of valve units between said inlet unit and said end block unit;

providing a manifold with a plurality of bores therein;

disposing said manifold in at least one of said valve units between the respective faying surfaces of the base part and the feeder part thereof with the bores of said manifold disposed in registry with said openings in said faying surfaces and establishing a second, complete fluid flow path between said inlet port and a different outlet port;

providing at least one further bore in said manifold extending between at least two of said bores and placing said at least two bores and the passages respectively in registry therewith in said at least one valve unit in fluid communication;

fastening said inlet block unit, said end block and said base parts in a fixed assembly; and fastening each feeder part in fixed assembly only to its associated base part and in said at least one valve unit fastening said feeder part and its associated base part in fixed assembly with said manifold therebetween.

* * * * *